United States Patent [19]
Jenkins

[11] Patent Number: 5,139,363
[45] Date of Patent: Aug. 18, 1992

[54] OIL RECOVERY APPARATUS AND METHOD

[76] Inventor: John T. Jenkins, 405 Iris, Irving, Tex. 75061

[21] Appl. No.: 596,779

[22] Filed: Oct. 12, 1990

[51] Int. Cl.$^5$ ............................................. E02B 15/04
[52] U.S. Cl. ........................................ 405/63; 405/68; 210/242.3; 210/776; 210/923
[58] Field of Search .................. 114/343, 270; 405/60, 405/63, 64, 65, 66–69; 210/242.3, 776, 923; 37/274, 281

[56] References Cited

U.S. PATENT DOCUMENTS

| | | | |
|---|---|---|---|
| 3,726,406 | 4/1973 | Damberger | 210/242.3 |
| 3,745,115 | 7/1973 | Olsen | 210/242.3 X |
| 3,831,756 | 8/1974 | Bhuta et al. | 210/923 X |
| 4,073,077 | 2/1978 | Essel | 37/281 |
| 4,146,482 | 3/1979 | Shyu | 210/923 X |
| 4,356,094 | 10/1982 | Ross | 405/63 X |
| 4,378,291 | 3/1983 | Ward et al. | 210/242.3 |
| 4,595,510 | 6/1986 | Windbladh et al. | 210/776 |
| 4,702,832 | 10/1987 | Renfrow | 210/242.3 |
| 5,022,785 | 6/1991 | Goans | 405/69 |

FOREIGN PATENT DOCUMENTS

| | | | |
|---|---|---|---|
| 2728835 | 1/1979 | Fed. Rep. of Germany | 405/63 |
| 977566 | 11/1982 | U.S.S.R. | 405/60 |
| 2044625 | 10/1980 | United Kingdom | 405/60 |

*Primary Examiner*—Randolph A. Reese
*Assistant Examiner*—John A. Ricci
*Attorney, Agent, or Firm*—W. Kirk McCord

[57] ABSTRACT

An oil recovery system includes an inflatable boom wall, a plurality of inflatable storage tanks at spaced intervals along the boom wall, and a plurality of oil catchers adjacent to each of the storage tanks. Selected ones of the oil catchers are attached to the boom wall, adjacent to the storage tanks, while other ones of the catchers are free-floating and attached to corresponding storage tanks by means of a flexible line. The oil recovery system further includes a plurality of plow boats, each of which has adjustable, bow-mounted plates for pushing oil and other surface contaminants into the oil catchers. The material collected by the catchers drains by gravity into the corresponding storage tanks for temporary storage. The storage tanks are pumped out periodically to transfer the contents thereof to permanent storage tanks aboard a barge or other oil collection vessel.

21 Claims, 3 Drawing Sheets

OIL RECOVERY APPARATUS AND METHOD

FIELD OF THE INVENTION

This invention relates generally to the recovery of oil and other contaminants and in particular to an apparatus and method for containing and recovering oil spills.

BACKGROUND OF THE INVENTION

The drilling and processing of hydrocarbons, particularly crude oil, is crucial to the maintenance of modern day society. A great deal of oil that is drilled and collected for refining is obtained from the earth beneath oceans and other large bodies of water. However, one of the most troublesome and difficult problems that ar encountered in offshore drilling and production is the ever-looming possibility of an oil spill. Whenever this occurs, either through a blow-out or a rupture in an oil transport line, an explosion on an oil rig, or a catastrophe encountered by an oil tanker at sea, the crude oil spills out onto the surface of the water, where currents may carry the oil for thousands of miles and eventually the oil may be washed up upon a beach or other shore line by wave action.

Initially, the spilled oil will float on the surface of the water and may be confined to a relatively small area. However, as time progresses, currents will disperse the oil over a progressively larger area and wave action will intersperse the oil with the water, making clean-up operations even more difficult. Furthermore, when the oil is washed up on a beach or shore, recreational use of the beach may be ruined for a considerable period of time and many species of wildlife may be severely damaged.

Numerous efforts by mankind to devise methods and systems for either preventing or containing oil spills have met with limited success. The quicker the clean-up operation begins, the more effective it will be. It is therefore necessary that oil recovery equipment be transported to the site of the spill and quickly deployed in order to expedite the clean-up operation and minimize the resulting damage.

DESCRIPTION OF THE PRIOR ART

Various types of oil recovery systems are known in the art. One type of system uses an inflatable boom to confine the oil spill, as shown in U.S. Pat. Nos. 4,059,962 and 4,211,659. In other types of systems, an oil-absorbing material is dispersed over the surface of the spill, as shown in U.S. Pat. Nos. 3,734,294 and 4,769,142. Furthermore, oil recovery systems typically include means for collecting oil and oily water and for separating the oil from the water, as shown in U.S. Pat. Nos. 3,710,943; 3,850,807; 4,146,482; 4,702,832; and 4,752,393.

Although prior art oil recovery systems have achieved some degree of success, their performance still leaves much to be desired. For example, waves and currents, particularly in the open ocean make it difficult to confine the oil spill and recover the oil before the oil is mixed with the sea water and reaches shore. Large oil spills are often dispersed in the open ocean, which severely limits the effectiveness of recovery operations.

OBJECTS OF THE INVENTION

It is therefore the principal object of the present invention to provide an improved oil recovery apparatus and method.

Another object of the invention is to provide an apparatus and method for enhancing the recovery of oil and other contaminants from a body of water.

Still another object of the invention is to provide improved apparatus and method for confining and recovering oil spilled in a body of water.

Yet another object of the invention is to provide an oil recovery apparatus which can be air-lifted to the site of an oil spill.

SUMMARY OF THE INVENTION

These and other objects are accomplished in accordance with the present invention wherein a new and improved apparatus and method for recovering material, such as oil and other contaminants, from a body of water includes barrier means for confining at least some of the material within a recovery zone, means having a top opening for being deployed in the recovery zone to capture material from the body of water, means operative in the recovery zone for urging material into the capturing means through the top opening thereof, and means coupled to the capturing means for storing material received therefrom.

In accordance with one feature of the invention, the barrier means includes a plurality of flexible sections sequentially connected to form an elongated wall. Each of the sections has an inflatable top member for floating on the surface of the water and a relatively flat bottom member, depending from the top member, for being submerged to provide an underwater barrier, extending from the surface to a predetermined depth.

In accordance with another feature of the invention, the capturing means is comprised of first and second capture devices, each of which has an internal passageway communicating with the top opening thereof. The first and second capture devices have a positive buoyancy, so that the respective top openings thereof are above the surface of the body of water. The first and second capture devices further include respective bottom openings communicating with the respective internal passageways. Each of the bottom openings is adapted for receiving a conduit, such as a flexible hose, for allowing material in the corresponding passageway to flow by gravity feed through the bottom opening of each of the capture devices into the storage means. Material, such as oil and other surface contaminants, is captured when the material spills over the top of a particular capture device and is directed downwardly into the corresponding passageway.

In accordance with yet another feature of the invention, the storage means includes at least one collapsible storage tank having an internal storage chamber. The tank further includes at least one inflatable member to maintain the tank in a positively buoyant condition. The base portion of the tank includes a ballast material for maintaining the tank in a relatively stable, upright position. Means is provided for communicating with the storage chamber, for allowing material to enter into and be removed from the tank.

In accordance with still another feature of the invention, at least one marine vehicle, having a pushing device mounted on the bow portion thereof, is provided for deflecting water and material on the surface of the water ahead of the vehicle. The pushing device includes a stationary central plate and first and second movable wing plates located in front of the central plate. Respective portions of the central plate and wing plates are submerged for exerting a pushing force on the water ahead of the vehicle. The first and second wing plates are movable laterally with respect to the central plate to adjust the lateral extent of the pushing device. Means is provided for adjusting the first and second wing plates laterally.

In the preferred embodiment, a barrier wall is deployed so as to at least partially surround the area of surface contamination, such as an oil spill. A plurality of storage tanks are positioned at predetermined intervals along the barrier wall. A plurality of first oil capture devices are positioned along the barrier wall, such that each of the first capture devices is coupled between a portion of the barrier wall and one of the storage tanks. Each of the first capture devices includes a bottom member, and front and back walls and side walls, extending upwardly from the bottom member, such that the front and back walls and side walls extend above the surface of the water. The back wall extends higher than the front wall, so that oil and water which spills over the front wall will be arrested by the back wall and directed downwardly within the internal passageway of the corresponding first capture device.

A plurality of second oil capture devices are located in the vicinity of each of the storage tanks, so that each of the second oil capture devices is substantially free-floating within the recovery zone, but is coupled to one of the storage tanks by means of a flexible hose or the like. The second oil capture device includes a bottom member and a substantially cylindrical wall extending upwardly therefrom above the surface of the water. The height of the cylindrical wall above the water surface varies around the perimeter of the top opening. A back portion of the wall extends higher than a front portion thereof, so that oil and water which spills over the front portion of the wall is arrested by the back portion thereof and directed downwardly within the internal passageway of the corresponding second capture device. The captured oil and water will then flow by gravity through the flexible hose into the corresponding storage tank.

Although a certain amount of oil will spill into the first and second capture devices by wave action as the prevailing currents carry the oil in the direction of the barrier wall, oil recovery is substantially enhanced by using marine vehicles to push the oil in the direction of the capture devices. To this end, a plurality of marine vehicles, having bow-mounted pushing devices, are deployed within the recovery zone for urging the oil on the surface of the water in the direction of the capture devices. The central plate and wing plates of each pushing device cooperate to define a concave pushing surface. Respective top and bottom portions of the central plates and wing plates terminate in respective curved flanges. The top and bottom curved flanges of the central plate define respective top and bottom channels for guiding the lateral movement of the wing plates. The respective curved bottom flanges of the central plate and wing plates penetrate through the water to enhance the pushing action and the respective top curved flanges of the central plate and wing plates inhibit spillage of oil and water over the top of the plates.

BRIEF DESCRIPTION OF THE DRAWINGS

The foregoing and other features, characteristics, advantages, and the invention in general, will be better understood from the following, more detailed description, taken in conjunction with the accompanying drawings in which.

DESCRIPTION OF THE PREFERRED EMBODIMENT

It will be appreciated that for purposes of clarity and where deemed appropriate, reference numerals have been repeated in the Figures to indicate corresponding features.

Figure 1:
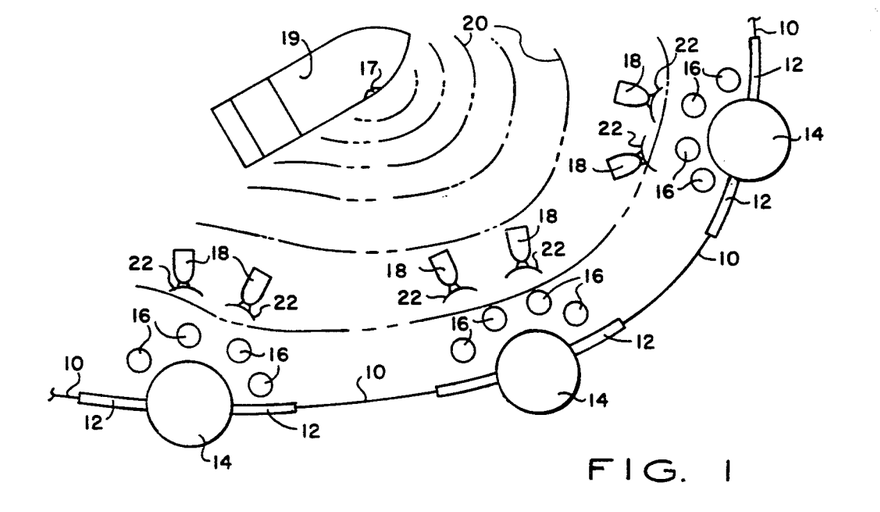
FIG. 1 is a top plan view of an oil recovery operation in accordance with the present invention.

Referring now to FIG. 1, an oil recovery system in accordance with the present invention includes an inflatable boom wall 10 having a plurality of elongated oil catchers 12 and a plurality of storage tanks 14, attached at predetermined positions along boom wall 10, a plurality of free-floating, substantially cylindrical oil catchers 16, and a plurality of plow boats 18 for urging oil and other contaminants in the direction of the oil catchers 12 and 16, as shown. FIG. 1 depicts oil being spilled onto the surface of a body of water through a hole 17 in an oil tanker 19, as indicated by the curved lines 20. Currents and wave action will disperse the oil over the surface of the water and will tend to move the oil in a direction corresponding to the prevailing currents in that area. Lines 20 illustrate the dispersal of the oil over a progressively larger area as it is carried away from the source of the spill by the prevailing currents.

Boom wall 10 is positioned "downstream" of the spill to provide a floating barrier. Boom wall 10 is preferably of sufficient length to at least partially surround the spill, and confine the spill within a prescribed recovery zone. As the spill moves toward boom wall 10, at least some of the oil will be captured by oil catchers 12 and 16 in the vicinity of storage tanks 14. Plow boats 18 each have a bow-mounted pushing device 22 for urging the oil toward oil catchers 12 and 16, to enhance the recovery operation.

Figures 2, 8:
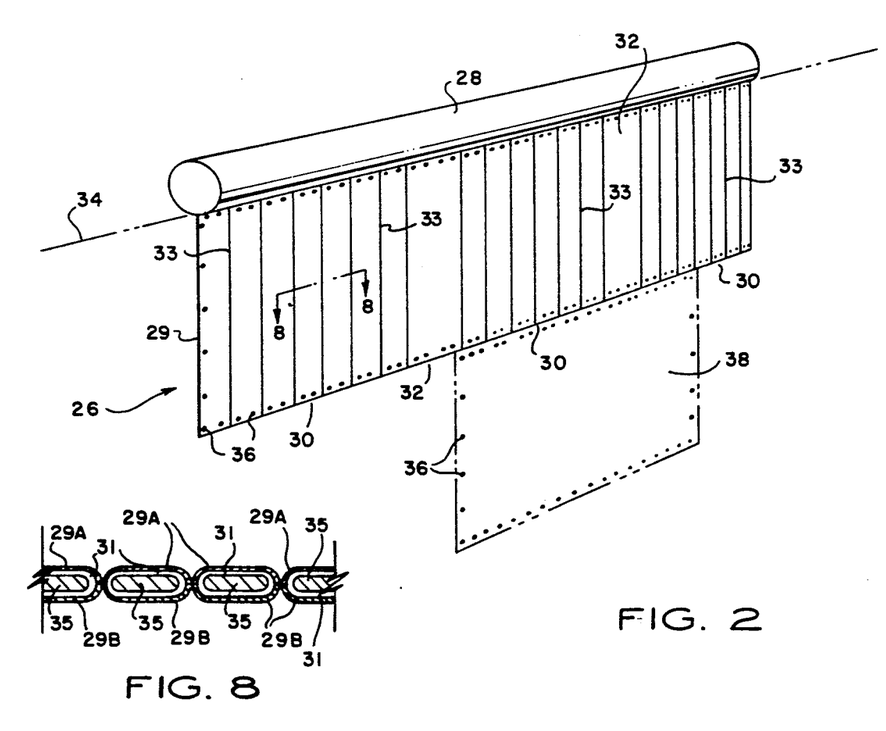
FIG. 2 is a perspective view of an inflatable boom wall for confining an oil spill, according to the present invention.
FIG. 8 is a sectional view of the inflatable boom wall taken along line 8—8 of FIG. 2.

Boom wall 10 is comprised of a plurality of flexible sections 26 connected end to end to define an elongated wall for confining the oil spill. Referring to FIG. 2, each section 26 is preferably comprised of a flexible material, such as virgin vinyl, and includes an inflatable top member 28 and a relatively flat bottom member 29 depending therefrom. As can be best seen in FIG. 8, bottom member 29 is comprised of two sheets of flexible material 29A and 29B in facing relation and joined together along respective vertical seams 33 to define a corresponding plurality of discrete internal chambers 31.

Top member 28 is completely enclosed for defining an inflatable chamber. A canister or other source of air pressure (not shown) is preferably disposed within the inflatable chamber of top member 28. The canister or other source of air pressure is activatable by conventional means when the corresponding section 26 is deployed.

Selected ones of the chambers 31 contain ballast material, such as lead weights 35, to hold bottom member 29 in a vertical orientation when submerged. Each lead weight 35 substantially fills the corresponding weighted chamber 31. Successive weighted chambers define a weighted portion 30. Three weighted portions 30 are depicted in FIG. 2. Other ones of the chambers are not weighted, to define respective unweighted portions 32, respectively interspersed between adjacent weighted portions 30. Two unweighted portions 32 are depicted in FIG. 2. Each weighted portion 30 extends horizontally approximately six feet and each unweighted portion 32 separating adjacent weighted portions 30 extends horizontally approximately eight inches. Unweighted portions 32 provide convenient fold regions, so that each section 26 can be folded when it has been recovered aboard an aircraft or boat and the corresponding top member 28 is deflated. The vertical (depth) dimension of each section 26 will vary depending upon its position in boom wall 10. For example, in the area of the heaviest oil spill, sections 26 may extend down to eight feet below the waterline. At the opposite ends of boom wall 10, sections 26 may extend underwater only two feet. The depth dimension of the intermediate sections 26 will typically fall in the range between two feet and eight feet.

As shown in FIG. 2, when section 26 is deployed, the inflated top member 28 will ride at or just above the water level 34. Weighted portions 30 and unweighted portions 32 will extend from water level 34 downwardly to form a barrier from the surface of the water down to a predetermined depth. Section 26 includes a plurality of tie rings 36 at spaced intervals of approximately one foot along the top, bottom and side edges thereof for attaching each section 26 to the next adjacent section 26 on each side thereof or for attaching a particular section 26 to a corresponding boom-mounted catcher 12. A suitable attachment member, such as a heavy plastic "slip-tie" (not shown), is preferably used to interconnect adjacent sections 26 and to connect particular ones of the sections 26 to a corresponding catcher 12.

To enhance stability and to increase the drag force on boom wall 10, one or more weighted panels 38 can be suspended at predetermined positions below boom wall 10. One such panel 38 is depicted in FIG. 2. Each panel 38 includes a plurality of tie-rings 36, adapted for receiving an attachment device, such as a plastic "slip-tie" (not shown), to secure the panel 38 to one of the sections 26 of boom wall 10. Each panel 38 is constructed in substantially the same manner and has substantially the same dimensions as one of the weighted portions 30. When a panel 38 is attached to boom wall 10, panel 38 will hang below the corresponding section 26, as illustrated in FIG. 2. In lieu of adding panels 38 at selected locations along boom wall 10, a conventional anchoring device can be attached to boom wall 10, particularly if it is desired to maintain boom wall 10 in a fixed position.

Figure 3A:
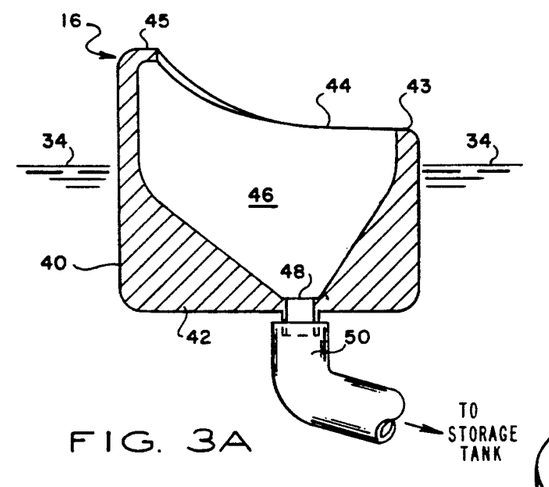
FIGS. 3A and 3B are respective side elevation and perspective views of a free-floating oil collection device, in accordance with the present invention.
Figure 3B:
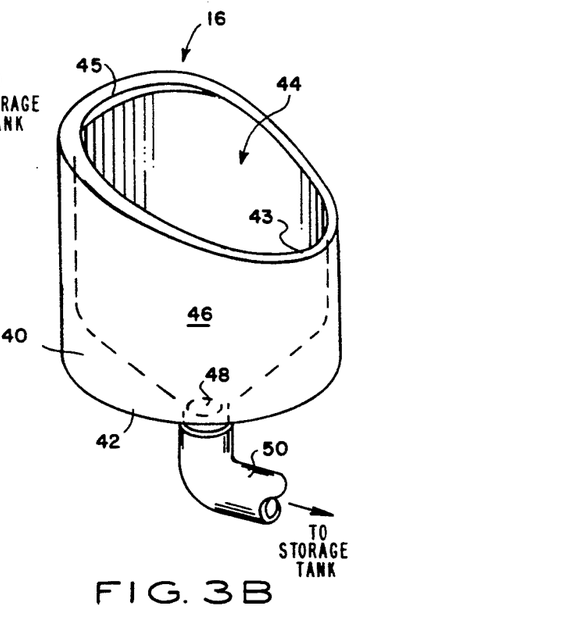

Referring to FIGS. 3A and 3B, oil catcher 16 is preferably comprised of a relatively rigid, lightweight material for maintaining a positive buoyancy, so that at least a portion thereof extends above water level 34, as best shown in FIG. 3A. Oil catcher 16 is in the shape of a truncated cylinder, the vertical height of wall 40 above base 42 being variable around the circumference of a top opening 44. The diameter of top opening 44 is preferably on the order of fifteen feet. As best seen in FIG. 3A, wall 40 extends above water line 34 approximately eight inches at its lowest point (as indicated at 43) and approximately three feet at its highest point (as indicated at 45).

A plurality of oil catchers 16 are located in the vicinity of each storage tank 14, as seen in FIG. 1. The lowest part of wall 40, as indicated at 43, faces away from boom wall 10 in the direction of the oil spill, so that oil and other contaminants on the surface of the water can spill over the top of wall 40 at lowest part 43 and into the corresponding catcher 16. The highest part of wall 40, as indicated at 45, which is substantially diametrically opposed to lowest part 43, is high enough above the water level 34, so that even at the crest of a wave, the oil will not spill over high part 45. When oil and other contaminants are captured by an oil catcher 16, high part 45 of wall 40 will deflect the oil and water downwardly into the bottom of catcher 16. Catcher 16 has a funnel-shaped interior passageway 46 communicating with top opening 44, and an opening 48, having a diameter of approximately eighteen inches, at the bottom of passageway 46. Catcher 16 has a relatively shallow depth. For example, bottom opening 48 will typically be submerged only two to three feet beneath water level 34 to maintain the gravity feed to the corresponding storage tank 14. A flexible hose 50 is attached at one end thereof to bottom opening 48 and at an opposite end thereof (not shown) to a corresponding storage tank 14. Flexible hose 50 acts as a conduit between oil catcher 16 and its corresponding storage tank 14, such that oil and oily water captured by catcher 16 will flow by gravity into the corresponding storage tank 14. Other than its connection to storage tank 14 by means of flexible hose 50, catcher 16 is substantially free-floating. Catcher 16 is preferably manufactured from a rotation molding polyethylene plastic or a gel-coated fiberglass. Although not shown in FIGS. 3A and 3B, tie-rings or other attachment devices can be located on the outside of catcher 16 to allow catcher 16 to be further secured to its corresponding storage tank 14.

Figure 4:
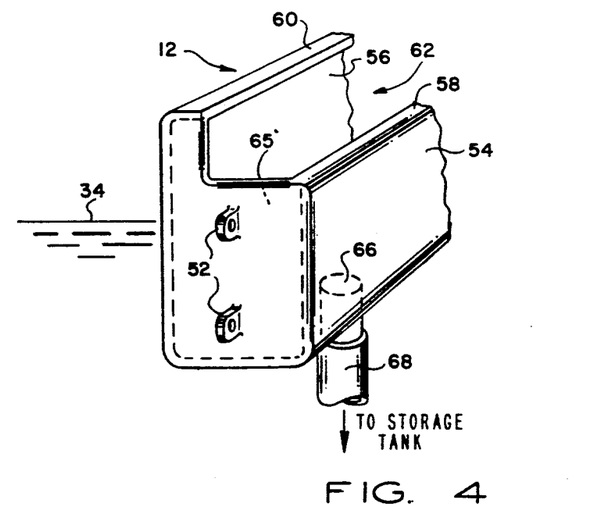
FIG. 4 is a partial perspective view of a boom wall-mounted oil collection device, in accordance with the present invention.

Referring to FIG. 4, each boom wall-mounted oil catcher 12 includes tie-rings 52 at each end thereof, to allow oil catcher 12 to be secured to a corresponding storage tank 14 at one end of catcher 12 and to boom wall 10 at the opposite end of catcher 12, as seen in FIG. 1. The tie rings 52 at only one end of catcher 12 are shown in FIG. 4. Catcher 12 extends horizontally between the corresponding storage tank 14 and boom wall 10 at least fifteen feet. Catcher 12 is configured in the shape of an elongated trough, having a front wall 54 and a back wall 56, which extends substantially higher above water level 34 than front wall 54. Both front wall 54 and back wall 56 terminate in respective top flanges 58 and 60, which extend inwardly to partially close top opening 62. One skilled in the art will appreciate that the opposed ends of catcher 12 are closed, so that catcher 12 will be substantially completely enclosed, except for top opening 62.

Front wall 54 preferably extends above water level 34 approximately eight inches and back wall 56 extends above water level 34 approximately three feet, so that catcher 12 functions in substantially the same manner as catcher 16, described above with reference to FIGS. 3A and 3B. Specifically, oil and oily water which spill over the top of front wall 54 are captured by catcher 12. Back wall 56 is preferably high enough above water level 34 to prevent the oil and oily water from spilling over back wall 56, so that the oil and oily water which spill over the top of front wall 54 are substantially captured by catcher 12. Catcher 12 has an interior passageway 65, communicating with top opening 62, and an opening 66, having a diameter of approximately eighteen inches, at the bottom of passageway 65. A flexible hose 68 connects catcher 12 with one of the storage tanks 14, so that the oil and oily water flowing through bottom opening 66 will be conducted by gravity feed into the corresponding storage tank 14. Catcher 12 has a relatively shallow depth. For example, bottom opening 66 will typically be submerged only two to three feet to maintain the gravity feed to the corresponding storage tank 14.

Figure 5:
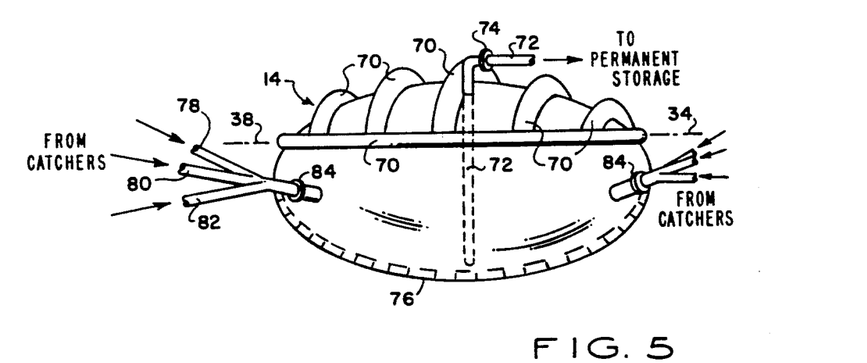
FIG. 5 is a perspective view of an inflatable storage tank, in accordance with the present invention.

Referring to FIG. 5, a collapsible storage tank 14 is depicted in detail. Tank 14 is preferably manufactured from a relatively thick (at least one inch or more), reinforced virgin vinyl. A plurality of inflatable rings 70 are disposed on the top portion of tank 14 for providing the required buoyancy. As tank 14 fills up with oil and oily water, rings 70 can be inflated sequentially to counteract the increasing weight within storage tank 14 as tank 14 is progressively filled from corresponding ones of catchers 12 and 16. A canister or other source of air pressure (not shown) is located within each of the inflatable rings to allow sequential activation of rings 70 in a conventional manner.

An inlet/outlet line 72, having a diameter of approximately ten inches, extends from an interior bottom portion of tank 14 through the top thereof. A butterfly valve 74 is located in line 72 for selectively opening and closing line 72. When storage tank 14 is first deployed, it is in a substantially collapsed state, so that air pressure must be introduced therein to inflate the tank 14 to the desired storage capacity. Air pressure is introduced into tank 14 via line 72. Butterfly valve 74 is opened and an air hose (not shown) is connected directly to line 72 for introducing air pressure into tank 14. When the air hose is disconnected, valve 74 is closed to maintain air pressure within storage tank 14. As tank 14 expands because of the air pressure being introduced therein, a base portion 76, containing a ballast material, such as lead weights, will sink to maintain tank 14 in a stable, upright position, as shown in FIG. 5. In normal operation, only a relatively small top portion of tank 14 will be above water level 34. By maintaining only a relatively small portion of storage tank 14 above water level 34, the stability of tank 14 is enhanced and the gravity flow of oil and other contaminants from catchers 12 and 16 into tank 14 is facilitated.

A connector fitting, having three eighteen inch feed lines 78, 80 and 82, is located on each side of storage tank 14. Each connector fitting further includes a butterfly valve 84, which is in an open position for allowing material in feed lines 78, 80 and 82 to flow by gravity feed into storage tank 14. When tank 14 is full or when recovery of tank 14 is desired, valves 84 are closed to prevent material from flowing into or out of tank 14. One of the feed lines 78, 80 or 82 on each side of tank 14 is connected to an adjacent boom wall-mounted catcher 12, while the other two feed lines are connected to two of the free-floating catchers 16. Thus, storage tank 14 will accumulate material collected by the two adjacent boom wall-mounted catchers 12 and from four of the free-floating catchers 16.

The contents of tank 14 are removed via inlet/outlet line 72 by opening butterfly valve 74 and connecting a pump suction hose (not shown) thereto. The contents are then pumped out of storage tank 14 to a permanent storage tank aboard an oil recovery vessel (not shown), which is preferably located on the opposite side of boom wall 10 from the oil spill. Since the water is heavier than the oil, the water will sink to the bottom of tank 14 and will be pumped out of tank 14 through line 72 before the oil. Upon completion of the pumping operation, butterfly valve 74 is returned to the closed position. Lines 78, 80 and 82 feed into tank 14 at a position below water level 34 and sufficiently below the respective bottom openings of the catchers 12 and 16 which are connected to tank 14, to maintain a gravity feed into tank 14. However, the lower the lines 78, 80 and 82 feed into tank 14, the less will be the storage capacity thereof because the level of material within tank 14 must be maintained below the positions at which lines 78, 80 and 82 feed into tank 14. Otherwise, material would backflow from tank 14 into feed lines 78, 80 and 82. The respective connections of feed lines 78, 80 and 82 to tank 14 should be approximately three to five feet below water level 34 so that the connections are below the respective bottoms of the corresponding catchers 12 and 16, to maintain the required gravity flow, while allowing efficient use of the storage capacity of tank 14. When full, tank 14 has a diameter in the range from thirty to sixty feet at its maximum dimension and extends twenty to forty feet below water line 34.

Figure 6:
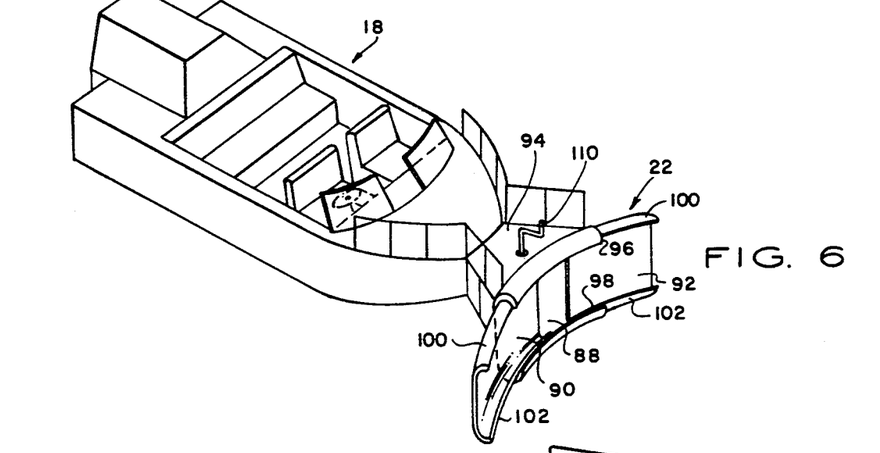
FIG. 6 is a perspective view of marine vehicle, which is equipped for pushing oil and water in a predetermine direction, in accordance with the present invention.
Figure 7:
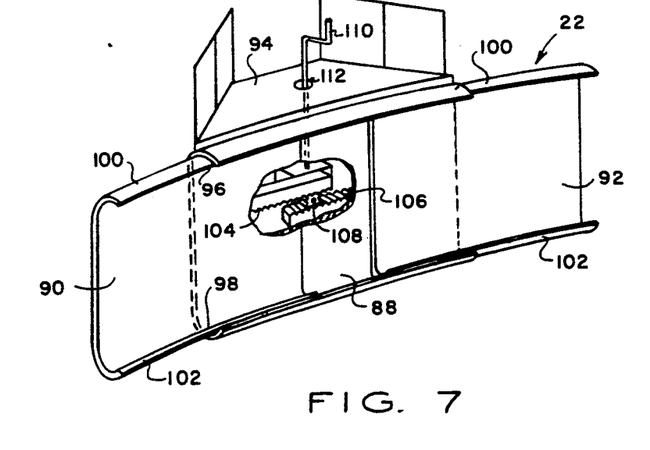
FIG. 7 is a perspective view of a pushing device mounted on the bow of the marine vehicle of FIG. 6.

Referring to FIGS. 6 and 7, each plow boat 18 includes a bow-mounted pushing device 22, which is comprised of a stationary central plate 88 and two movable wing plates 90 and 92. Central plate 88 is attached to the front of a relatively flat work platform 94. Respective top and bottom portions of plates 88, 90 and 92 terminate in respective curved flanges. The bottom curved flanges of plates 88, 90 and 92 are submerged during normal operation and penetrate through the water to facilitate movement of plates 88, 90 and 92 through the water. The top curved flanges of plates 88, 90 and 92 are above the water line for deflecting water and spray downwardly and out ahead of plow boat 18 to inhibit spillage over the top of plates, 88, 90 and 92. Respective top and bottom curved flanges 96 and 98 of central plate 88 define respective top and bottom channels for receiving respective curved top and bottom curved flanges 100 and 102 of wing plates 90 and 92.

As best seen in FIG. 7, wing plates 90 and 92 are laterally movable, as constrained by top and bottom flanges 96 and 98, by means of a gear mechanism, which is comprised of a pair of elongated toothed racks 104 and 106, respectively coupled to wing plates 90 and 92, and a pinion 108, which is operable by means of a handle 110, extending through an opening 112 in work platform 94. The teeth of pinion 108 are in meshing engagement with the teeth of both racks 104 and 106. In operation, the rotation of handle 110 in a clockwise direction (as viewed from the perspective of FIG. 7) also rotates pinion 108 in a clockwise direction, thereby moving racks 104 and 106, and the respective plates 90 and 92 attached thereto, toward one another, and decreasing the lateral extent of pushing device 22. Rotation of handle 110 in a counterclockwise direction also rotates pinion 108 in a counterclockwise direction, thereby separating racks 104 and 106, and the respective plates 90 and 92, to increase the lateral extent of pushing device 22. Central plate 88 is positioned behind wing plates 90 and 92 to provide a rear support member.

When wing plates 90 and 92 are positioned as shown in FIGS. 6 and 7, a portion of central plate 88 is exposed, so that plates 88, 90 and 92 define a continuous, concave surface for pushing oil and other contaminants at or near the surface of the water toward selected ones of oil catchers 12 and 16. The pushing action of plow boats 18 will pile up oil and oily water in the vicinity of catchers 12 and 16, so that oil and oily water will spill over into the corresponding catchers 12 and 16. Each of the plates 88, 90 and 92 has a lateral extent of approximately seven feet. Wing plates 90 and 92 are adjustable laterally approximately four feet, so that when plates 90 and 92 are fully extended laterally, at least the innermost three feet of each plate 90 and 92 is supported from behind by central plate 88.

The oil recovery apparatus and method described above is particularly well-suited for being transported by air to the site of an oil spill and for being rapidly deployed from an aircraft. The boom wall and storage tanks are inflated after being deployed on site, so that the boom wall and storage tanks can be stored in a deflated condition on board a transport aircraft, such as a relatively large cargo plane which is the civilian equivalent of the Air Force C-5 Galaxy, manufactured by Lockheed Aircraft Corporation. The non-inflatable components, namely the free-floating and boom wall-mounted oil catchers, are relatively small and can be transported to the oil spill site either by air or by boat. The oil recovery apparatus and method according to the present invention provides significant advantages over prior art recovery apparatus and method, not only in terms of reduced deployment time, but also in terms of efficiency and effectiveness of the clean-up operation.

Although the invention has been described in part by making detailed reference to a preferred embodiment, such detail is intended to be and will be understood to be instructional rather than restrictive. It will be appreciated by those skilled in the art that variations may be made in the structure and operation without departing from the spirit and scope of the invention, as defined by the claims appended hereto.

I claim:

1. Apparatus for recovering oil from the surface of a body of water, comprising:

barrier means for confining at least some of the oil within a recovery zone, said barrier means including a plurality of flexible sections sequentially connected to form an elongated barrier wall, each of said sections having an inflatable top member for being floated on the surface of the water and a relatively flat bottom member, depending from the top member for being submerged to provide an underwater barrier extending from the surface to a predetermined depth;

a plurality of storage tanks at spaced intervals along said barrier means;

a plurality of first devices for capturing oil from the surface of the water connected to the barrier means and to the respective storage tanks, such that each of the first oil capture devices is interposed between said barrier means and a particular one of said storage tanks, each of said first oil capture devices having a top opening above the surface of the water and an internal passageway communicating with said top opening;

a plurality of second devices for capturing oil connected to the respective storage tanks, such that said second oil capture devices are substantially free-floating within the recovery zone, each of said second oil capture devices having a top opening above the water line and an internal passageway communicating with the corresponding top opening;

means connecting the first plurality of oil capture devices and the second plurality of oil capture devices to the respective storage tanks, so that oil captured by each of the first and second oil capture devices flows by gravity into a particular storage tank; and means operative within the recovery zone for pushing oil in the direction of the barrier means, so that at least some of the oil spills into the respective passageways of at least some of the first and second oil capture devices, through the respective top openings thereof, said captured oil being conducted by gravity flow to the corresponding storage tanks.

2. The apparatus of claim 1 wherein each of said storage tanks is a collapsible tank having an internal storage chamber, each of said tanks having at least one inflatable member located on a top portion thereof to maintain the corresponding tank in a positively buoyant condition when deployed, each of said tanks having a base portion with ballast material for maintaining the corresponding tank in a relatively stable, upright position with a substantial portion of the corresponding tank being submerged when deployed, each of said tanks further including coupling means for receiving a conduit to connect the corresponding tank to selected ones of the oil capture devices, such that material is conducted by gravity feed from the selected ones of the oil capture devices to the corresponding tank.

3. The apparatus of claim 1 wherein each of said first plurality of oil capture devices includes a bottom member and front and back walls and side walls, extending upwardly from said bottom member, to define an internal passageway, each of said first plurality of capture devices having a top opening communicating with said internal passageway, each of said first plurality of oil capture devices having a positive buoyancy, such that said front and back walls extend above the surface of the water when the first capture device is deployed, said back wall extending above said front wall for directing material which spills over the front wall downwardly into the passageway, said front and back walls each having inwardly extending flanges for defining said top opening and for urging material which spills over the front wall into the passageway.

4. The apparatus of claim 1 wherein each of said second plurality of oil capture devices includes a bottom member and a substantially cylindrical wall extending upwardly therefrom to define an internal passageway, each of said second plurality of oil capture devices having a top opening communicating with said passageway, each of second plurality of oil capture devices having a positive buoyancy so that the cylindrical wall thereof extends above the surface of the water, the height of the wall above the surface being variable around the perimeter of the top opening, so that a back portion of the wall extends higher than a front portion thereof, said back portion urging material which spills over the front wall downwardly into the passageway, said bottom member having a bottom opening communicating with said passageway.

5. A method of recovering oil from a body of water, comprising the steps of:
   deploying barrier means having an inflatable top member and a relatively flat bottom member, depending therefrom, and inflating the top member, so that the top member floats on the water and the bottom member is submerged to form a barrier wall extending from the surface to a predetermined depth, said barrier wall for at least partially confining said oil within a recovery zone;
   connecting a plurality of storage tanks to the barrier wall at spaced intervals along the barrier means;
   connecting a plurality of first oil capture devices to said barrier means and to the respective storage tanks, so that each of the first oil capture devices is interposed between said barrier means and a particular one of said storage tanks, each of said first oil capture devices having a top opening above the surface of the water and an internal passageway communicating with said top opening;
   deploying a plurality of second oil capture devices within the recovery zone and connecting the second oil capture devices to the respective storage tanks, so that the second oil capture devices are substantially free-floating within the recovery zone, each of said second oil capture devices having a top opening above the water line and an internal passageway communicating with said top opening;
   connecting the first and second oil capture devices to the respective storage tanks so that oil captured by each of the first and second oil capture devices flows by gravity into a particular storage tank;
   pushing oil within the recovery zone in the direction of the barrier means, so that at least some of the oil spills into the respective passageway-- of at least some of the first and second oil capture devices, through the respective top openings thereof; and
   allowing the oil entering the respective passageways of the first and second oil capture devices to flow by gravity into the respective storage tanks.

6. Apparatus for recovering material from a body of water, comprising:
   barrier means for confining at least some of the material within a recovery zone, said barrier means being comprised of a plurality of flexible sections sequentially connected to form an elongated wall, each of said sections having an inflatable top member for being floated on the surface of the water and a relatively flat bottom member, depending from said top member, said bottom member being adapted for submergence to provide an underwater barrier extending from the surface of the water to a predetermined depth, each bottom member being comprised of first and second sheets of flexible material in facing relation and joined together to define a plurality of discrete internal chambers between the first and second sheets, selected ones of said chambers containing ballast material to define a plurality of weighted chambers to hold the bottom member in a substantially vertical orientation when submerged, at least one of the chambers in each section being an unweighted chamber;
   capture means having a top opening for being deployed in the recovery zone to capture material from the body of water, each of said sections having respective attachment members on respective opposed ends thereof for adapting the corresponding section to be attached to said capture means with said capture means intermediate first and second sections of said barrier means;
   means operative in the recovery zone for urging material into the capture means through the top opening thereof; and
   means communicating with the capture means for storing material received therefrom.

7. The apparatus of claim 6 further including at least one panel member adapted to be attached to the bottom member of at least one of the sections to increase the depth of at least a portion of the corresponding section.

8. The apparatus of claim 7 wherein said at least one panel member and said at least one of said sections each include a plurality of attachment rings, whereby said at least one panel member is suspendable below said at least one of the sections by tethering the attachment rings of said at least one panel member to the respective attachment rings of said at least one of the sections.

9. The apparatus of claim 6 wherein said capture means includes a bottom member and front and back walls and side walls, extending upwardly from said bottom member, to define an internal passageway, said capture means having a top opening communicating with said internal passageway, said capture means having a positive buoyancy, such that said front and back wall extend above the surface of the water when the capture means is deployed, said back wall extending above said front wall for directing material which spills over the front wall downwardly into the passageway, said bottom member having an opening communicating with said passageway, said conduit means including a line connecting said bottom opening to said storage means, whereby material in said passageway is conducted by gravity feed into the storage means.

10. The apparatus of claim 9 wherein said front and back walls each have inwardly extending flanges for defining said top opening and for urging material which spills over the front wall into the passageway.

11. The apparatus of claim 6 wherein said capture means includes a bottom member and a substantially cylindrical wall extending upwardly therefrom to define an internal passageway, said capture means having a top opening communicating with said passageway, said capture means having a positive buoyancy so that the cylindrical wall extends above the surface of the water, the height of the wall above the surface being variable around the perimeter of the top opening, so that a back portion of the wall extends higher than a front portion thereof, said back portion for urging material which spills over the front wall downwardly into the passageway, said bottom member having a bottom opening communicating with said passageway, said conduit means including a line for connecting said bottom opening to said storage means, whereby material in the passageway is conducted by gravity feed into the storage means.

12. The apparatus of claim 6 wherein said storage means includes at least one collapsible storage tank having an internal storage chamber, said tank having at least one inflatable member to maintain said tank in a positively buoyant condition and a base portion having a ballast material for maintaining said tank in a relatively stable, upright position, said tank further including means communicating with said storage chamber for allowing material to enter into and be removed from said tank.

13. The apparatus of claim 12 wherein said means communicating with said storage chamber includes coupling means for receiving a conduit connecting said storage tank to said capture means, whereby material is conducted by gravity feed from said capture means to said storage tank.

14. The apparatus of claim 6 wherein the ballast material of each chamber is a rigid weight which substantially fills the corresponding weighted chamber.

15. Apparatus for recovering material from a body of water, comprising:
   barrier means for confining at least some of the material within a recovery zone;
   capture means having a top opening for being deployed in the recovery zone to capture material from the body of water;
   means operative in the recovery zone for urging material into the capture means through the top opening thereof, said urging means including at least one marine vehicle having a pushing device mounted on the bow portion of the vehicle for deflecting material ahead of the vehicle; and
   means coupled to the capture means for storing material received therefrom.

16. The apparatus of claim 15 wherein said pushing device includes a stationary central plate and first and second wing plates located in front of said central plate, respective portions of said central plate and said wing plates being submerged for exerting a pushing force on the water ahead of the vehicle, said first and second wing plates being movable laterally with respect to said central plate to adjust the lateral extent of the pushing device.

17. The apparatus of claim 16 further including means for adjusting the lateral extent of said pushing device, said adjusting means including first and second toothed racks respectively connected to the first and second wing plates and a pinion in meshing engagement with the first and second racks, rotation of said pinion in a first direction for separating said racks and said first and second wing plates to increase the lateral extent of said pushing device, rotation of said pinion in a second direction, opposite from said first direction, for drawing the racks and wing plates toward one another to decrease the lateral extent of said pushing device.

18. The apparatus of claim 17 wherein the central plate and the wing plates define a concave pushing surface, respective top and bottom portions of the plates terminating in respective curved flanges, the top and bottom curved flanges of the central plate defining respective top and bottom channels for receiving at least portions of the respective top and bottom flanges of the wing plates for guiding the lateral movement of the wing plates.

19. The apparatus of claim 15 wherein said pushing device has a concave pushing surface.

20. Apparatus for recovering material from a body of water, comprising:
   means for confining at least some of the material within a recovery zone;
   means having a top opening for being deployed in the recovery zone to capture material from the body of water, said capture means including a bottom member and front and back walls and side walls, extending upwardly from said bottom member, to define an internal passageway, said capture means having a top opening communicating with said internal passageway, said capture means having a positive buoyancy, such that said front and back walls extend above the surface of the water when the capture means is deployed, said back wall extending above said front wall for directing material which spills over the front wall downwardly into the passageway, said bottom member having an opening communicating with said passageway, said front and back walls each having an inwardly extending flange for defining said top opening and for urging material which spills over the front wall into the passageway;
   means operative in the recovery zone for urging material into the capture means through the top opening thereof; and
   means coupled to the capture means for storing material received therefrom.

21. Apparatus for recovering material from a body of water, comprising:
   means for confining at least some of the material within a recovery zone;
   means having a top opening for being deployed in the recovery zone to capture material from the body of water, said capture means including a bottom member and a substantially cylindrical wall extending upwardly therefrom to define an internal passageway, said capture means having a top opening communicating with said passageway, said capture means having a positive buoyancy so that the cylindrical wall extends above the surface of the water, the height of the wall above the surface being variable around the perimeter of the top opening, so that a back portion of the wall extends higher than a front portion thereof, said back portion urging material which spills over the front wall downwardly into the passageway, said bottom member having a bottom opening communicating with said passageway.

* * * * *